United States Patent Office 2,983,057
Patented May 9, 1961

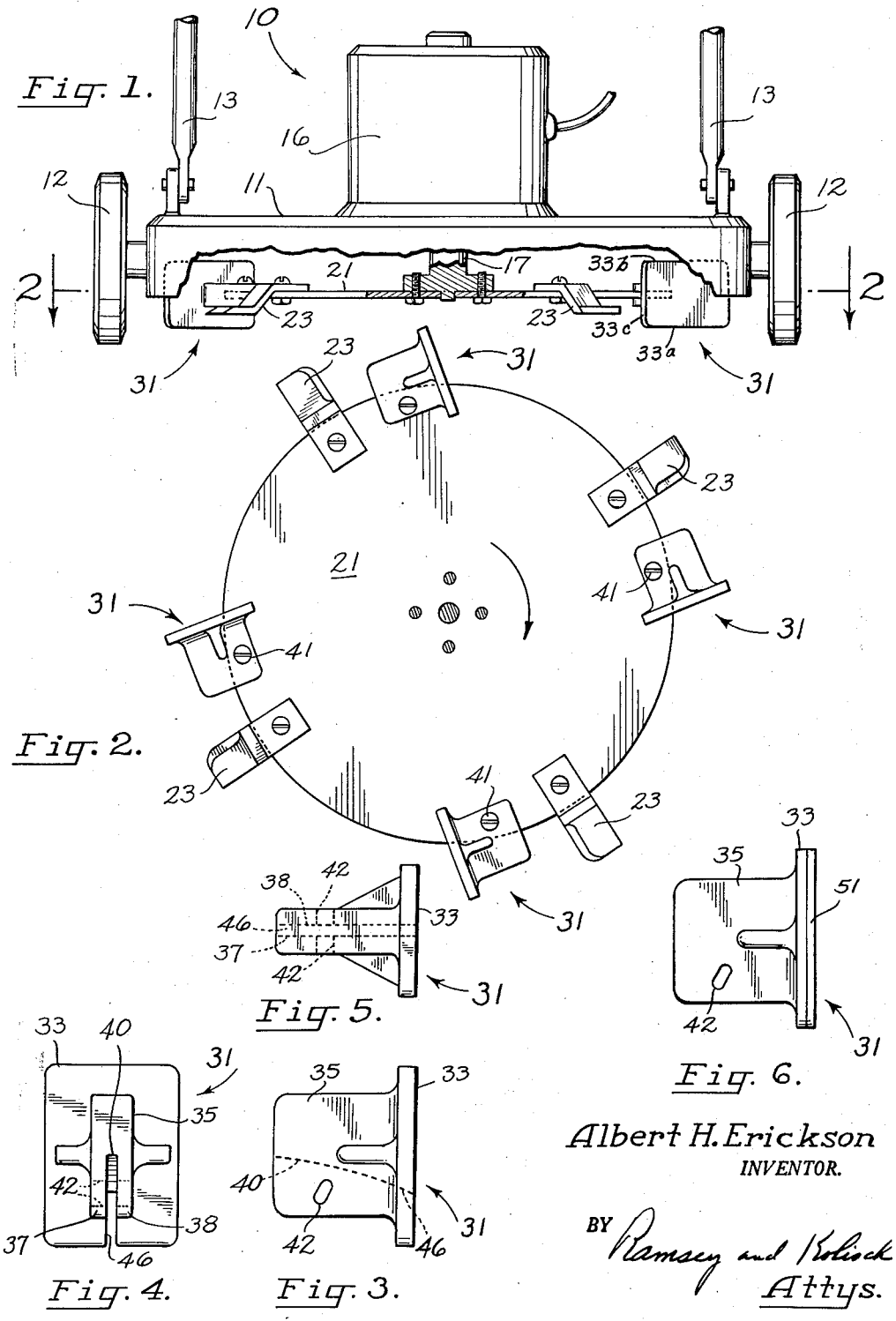

2,983,057
BLOWER HEAD ATTACHMENT FOR A ROTARY LAWN MOWER

Albert H. Erickson, 432 E. Main St., Hillsboro, Oreg.

Filed July 7, 1958, Ser. No. 746,858

4 Claims. (Cl. 37—43)

This invention relates to an attachment for lawn mowers, and more particularly to a blower head attachment for a rotary lawn mower which converts the mower into a road cleaner or a snow removal machine when the attachment is secured to the cutter means of a mower.

An object of the invention is to provide an inexpensive and easily installed attachment for rotary lawn mowers constructed and arranged to produce, after attachment to the cutter means of a mower, a centrifugal type blowing action in substantially a horizontal plane for the removal of snow. The attachment, on rotation of the cutter means, describes a path which is coincident with the swath defined by a mower cutter blade, and in this way the attachment operates to remove and to throw off material located in the swath of a cutter blade and protects the blade.

The attachment of the invention comprises a blower head provided at the forward end thereof with an upright plate portion having a front face which constitutes a blower or pusher face in the device. Integral with the plate portion and extending rearwardly thereof is a bifurcated clamp portion having opposed flanges spaced one from the other adapted to be fitted onto the cutter head or plate of the mower. The clamp portion is positioned and arranged on the plate portion so as to hold the plate portion with its lower edge only a short distance above the ground when mounted on a mower cutter means. This lower edge functions as a brushing edge which forces material upwardly into the path of the face of each blower head. The plate portion extends from this lower edge to an upper terminal edge, referred to herein as a "deflection edge" spaced above the elevation of the mower cutter blades. Thus the blades are fully protected.

The invention is discussed hereinbelow in conjunction with the accompanying drawing wherein:

Fig. 1 is a front view of the lower portions of a conventional rotary mower having cutter means rotatably carried for movement in a horizontal plane and equipped with the blower heads of this invention;

Fig. 2 is a section view along the line 2—2 in Fig. 1, illustrating the cutter blade portions of the cutter means and the arrangement of the blower heads on the cutter means;

Figs. 3, 4 and 5 are enlarged views of a blower head disassembled from the cutter means; and Fig. 6 shows a modified form of construction.

Referring now to the drawings, and with particular reference to Fig. 1, the blower head attachment is shown in conjunction with a conventional rotary lawn mower 10. Mower 10 comprises a mobile frame 11 supported for movement over the ground on wheels 12 located on opposite sides of the frame. A handle 13, only partially illustrated, is provided to guide the mower over the ground.

Frame 11 mounts motor 16 connected to an upright shaft 17 and operable to rotate the shaft about its longitudinal axis. Secured to an expanded base end of shaft 17 is a disc shaped mounting plate 21. Secured to the mounting plate are a series of cutter blade portions 23 projecting radially outwardly from the longitudinal axis of shaft 17. The cutter blade portions are all of substantially the same size and shape, and are spaced at regular angular modules about the periphery of plate 21. The plate is secured at its radial center to the end of shaft 17, and thus the cutter means of the mower, comprising the mounting plate and cutter blade portions, are dynamically balanced on the end of shaft 17. On energizing of motor 16, the cutter means is rotated in substantially a horizontal plane normal to the longitudinal axis of shaft 17.

The mower described above exemplifies one of various types of lawn mower constructions available on the market. While the invention is illustrated in connection with a manually propelled and electrically driven sickle mower, it is not intended to be limited by the specific details of the mower disclosed, as construction details vary depending upon the type of mower and its manufacturer. For instance, the invention herein disclosed is applicable to motor-propelled tractor-type mowers, as well as to those that are manually propelled, and to mowers powered by internal combustion engines rather than by electrical means. The invention in its broadest aspects is applicable to any rotary mower having a cutter means including a cutter blade portion which is rotated in a circular swath lying in substantially a horizontal plane. In a more limited sense, the invention is applicable to rotary mowers wherein the cutter blade portions of the mower are supported on a mounting plate similar to the mounting plate illustrated. Thus the specific embodiment of the invention described herein is one constructed for use with a mower having a cutter means comprising a mounting plate with plural cutter blades attached thereto.

Referring now in particular to Figs. 3, 4 and 5, a blower head constructed according to this invention is indicated at 31. The blower head illustrated is of one piece construction and comprises an upright plate portion 33 having a front face that constitutes a pusher face, and integral with plate portion 33 is a bifurcated clamp portion 35 extending rearwardly thereof.

Bifurcated clamp portion 35 comprises a pair of spaced, opposed flanges 37, 38 joined along their inner edges by a wall 40. The flanges are joined at substantially right angles with plate portion 33. Thus the plate portion maintains an upright position when the blower head is mounted on mounting plate 21 as shown in Figs. 1 and 2 with the forward face of the plate portion inclined only slightly away from a substantially perpendicular position with respect to the direction of travel of the blower head.

Wall 40, as best seen in Fig. 3, has a slightly curved outline corresponding to the curvature of the perimeter of plate 21. The wall extends rearwardly of the front face of plate portion 33 at an angle approaching a right angle. When the blower head is mounted on the mounting plate, wall 40 abuts with the peripheral edge of the mounting plate to hold the blower head firmly in position. A blower head is secured to plate 21 by nut and bolt assemblies 41 with the bolt portion of the assemblies threaded through mating slots 42 provided in flanges 37, 38. Slots are provided instead of holes, to enable adjustment of the blower head until wall 40 is in tight abutting relation with the periphery of the mounting plate.

A groove 46 is formed in plate portion 33 with the walls which define the groove providing a channel which is a continuation or extension of the channel defined by flanges 37, 38 and wall 40. The groove enables mounting of the blower head on the mounting plate with inner edge portions of plate portion 33 held above and below the mounting plate.

By inclining the forward face of plate portion 33 slightly away from perpendicular with respect to the direction of travel of the blower head, a better cleaning action is produced as material passes more easily off the outer edge portions of its plate portion on rotation of the blower head.

A blower head is mounted on the mounting plate in advance of each cutter blade portion 23. (The cutter means shown in Fig. 2 is constructed for rotation in a clockwise direction in Fig. 2.) The lower edge 33a of plate portion 33 for each blower head (that constitutes a "brushing edge"), when the head is mounted on the mounting plate, is carried below the level of the cutter blade portion and slightly above the ground. The upper edge 33b of each plate portion (that constitutes a "deflection edge") is spaced above the level of the cutter blade portions. The radially outer edges 33c of the blower heads are spaced at a distance from the center of shaft 17 which is substantially equal to the spacing of the radially outer edges of the cutter blades from the center of shaft 17. On rotation of the cutter means, the blower heads rotate in a circular path which coincides with the common swath through which the cutter blade portions move. Thus the blower heads clear away material from the cutter blade portions and prevent damage to the cutter blades. This is an important consideration in a snow or trash removal machine of the type contemplated. It should be remembered that the cutter means of a rotary mower is rotated at high speed, and the cutter blade portions are susceptible to damage if they should strike rocks or other objects.

The blower heads are mounted on plate 21 at regular angular modules about the rotation axis of the cutter means. Further they are of the same size and mass. In this way the dynamic balance of the cutter means is not destroyed upon mounting of the blower heads.

Preferably the blower heads are made of a light material, such as aluminum or the like. A light material is preferred as it does not build up much mass in the cutter means and does not disturb the dynamic balance of the cutter means to a great degree should there be slight irregularities between various blower heads.

In some instances it may be desirable to mount a facing of rubber or other elastic material over the front face of plate portion 38. Such a facing shown in Fig. 6 at 51, absorbs shocks that otherwise would be transmitted directly to the blower heads and their mounting if they strike an object of relatively heavy mass. The facing may be secured in place in any suitable manner as by using an adhesive. A blower head constructed of metal and equipped with an elastic facing is preferable to a blower head wholly of rubber or like elastic material, as the latter type of blower head tends to deform under the centrifugal force created by rotation of the cutter means.

It is claimed and desired to secure by Letters Patent:

1. In a lawn mower having a mobile frame and a power driven cutter means mounted on said frame for rotary movement about an upright rotation axis, said cutter means having a blade portion projecting radially outwardly from said rotation axis and moving in a circular path about said rotation axis in substantially a horizontal plane, a blower head secured to said cutter means and carried in advance of said blade portion, said blower head having an upright pusher face portion terminating along its base in a scraping edge spaced vertically below and terminating along its top in a deflecting edge spaced vertically above the plane of movement of said blade portion, said face portion being positioned and arranged on said cutter means to be moved by said cutter means in a circular path coincident with the swath of said blade portion.

2. In combination, a rotary lawn mower having a mobile frame and cutter means mounted on said frame for rotary movement about an upright rotation axis, said cutter means having plural cutter blade portions projecting radially outwardly from said rotation axis, said cutter blade portions revolving in a common circular swath about said rotation axis, plural blower heads detachably secured to said cutter means, the latter being spaced at regular angular modules about said rotation axis and dynamically balanced on said cutter means, each of said blower heads having an uprightly arranged pusher face portion terminating along its base in a scraping edge spaced vertically below the plane of movement of said cutter blades and terminating along its top in a scraping edge spaced vertically above this plane of movement, said blower heads rotating on rotation of said cutter means in a path which coincides with the swath of said cutter blade portions.

3. A blower head for a rotary mower having a disc-shaped mounting plate supporting at least one blade portion projecting outwardly from the perimeter of said mounting plate, said blower head comprising an upright plate portion with a substantially flat face over one side thereof, a bifurcated clamp portion integral with said plate portion projecting from the opposite side of said plate portion, said bifurcated clamp portion having a pair of oppositely disposed flanges and a wall portion joining the flanges, said wall portion extending outwardly from said plate portion substantially normally to the plane of said face at a point intermediate the peripheral edges of said plate portion, said wall portion and flanges defining a receiving channel extending substantially normally to the plane of said face adapted to be fitted over the edge of said mounting plate, said plate portion having wall portion defining a groove therein which is an extension of said receiving channel.

4. In a rotary, power driven mower having a disc-shaped mounting plate supported in substantially a horizontal plane, motor means connected to the mounting plate for rotating the same about an upright rotation axis, and a cutter blade portion connected to said mounting plate projecting from its perimeter and moving in a circular swath on rotation of said plate, the improvement comprising, in combination with said mounting plate, a blower head mounted on the plate in advance of the cutter blade portion, said blower head being positioned and arranged to rotate on rotation of said mounting plate in a path which is substantially coincident with the swath of said cutter blade portion, said blower head having an upright plate portion with a substantially flat pusher face facing forwardly of the cutter blade portion that extends above and below the level of the cutter blade portion, said plate portion having a groove formed therein fitting over the edge of the mounting plate whereby portions of the plate portion lie on opposite sides of the mounting plate, said blower head having a bifurcated clamp portion integral with said plate portion projecting from the plate portion rearwardly from the pusher face of the plate portion, said bifurcated clamp portion comprising a pair of opposed flanges and a wall joining the flanges, the wall and flanges defining a receiving channel fitting over the edge of said mounting plate.

References Cited in the file of this patent
UNITED STATES PATENTS

| | | |
|---|---|---|
| 1,095,097 | Fournet | Apr. 28, 1914 |
| 2,437,116 | Oppegaard | Mar. 2, 1948 |
| 2,471,367 | Cavaness | May 24, 1949 |
| 2,706,441 | Caldwell et al. | Apr. 19, 1955 |
| 2,752,699 | Gustafson | July 3, 1956 |
| 2,777,270 | Colclazier | Jan. 15, 1957 |
| 2,797,502 | Griffith et al. | July 2, 1957 |
| 2,806,339 | Whitney | Sept. 17, 1957 |
| 2,863,162 | Draughon | Dec. 9, 1958 |